Figure 1:
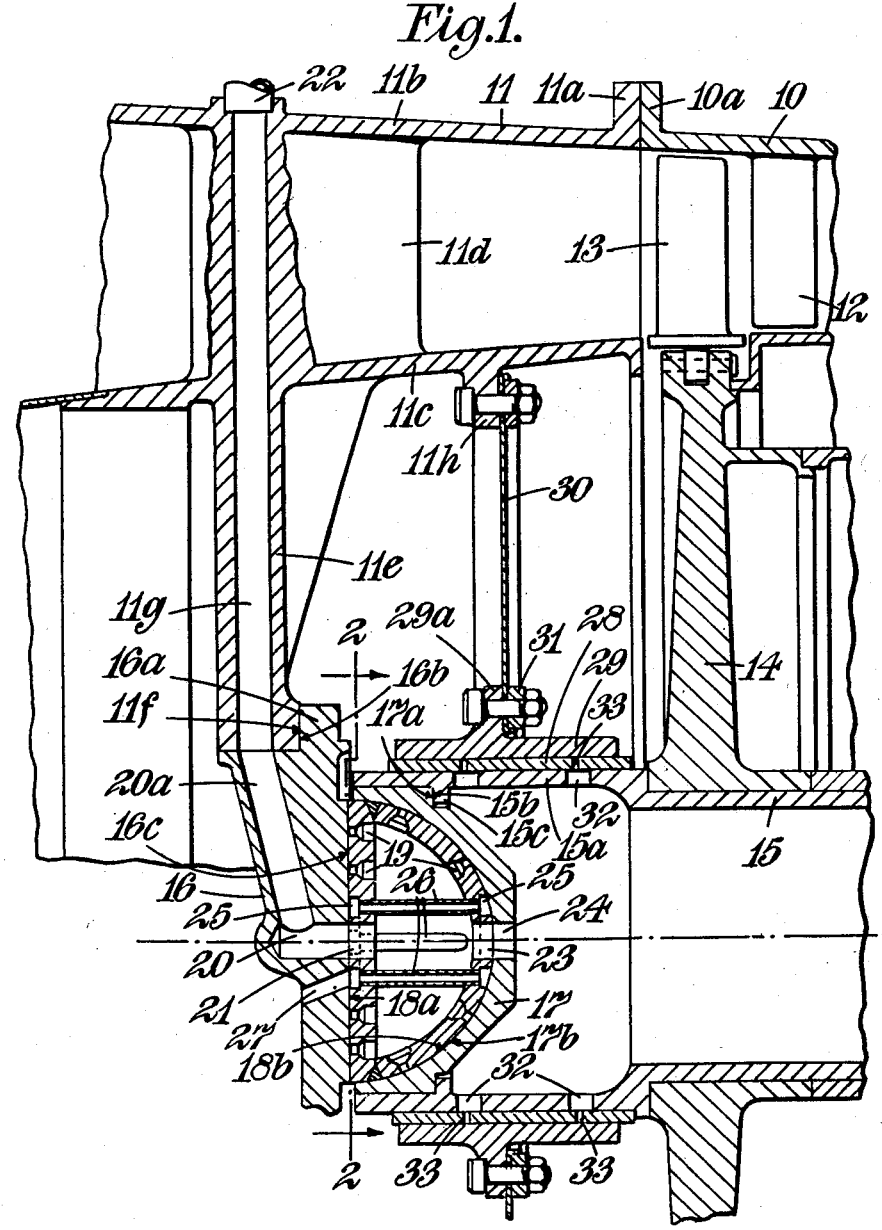

Feb. 23, 1960      N. BATTLE      2,926,050
AIR LUBRICATED THRUST BEARING

Filed Jan. 31, 1958      2 Sheets-Sheet 2

United States Patent Office 2,926,050
Patented Feb. 23, 1960

2,926,050

AIR LUBRICATED THRUST BEARING

Norman Battle, Chilwell, England, assignor to Rolls-Royce Limited, Derby, England, a British company Application January 31, 1958, Serial No. 712,348

Claims priority, application Great Britain
February 4, 1957

6 Claims. (Cl. 308—170)

This invention relates to bearing arrangements for the shafts of rotary machines and in particular to bearings employing air or another suitable gas as a lubricant.

An object of the invention is to provide an improved form of bearing arrangement for resisting the axial thrust produced on the rotor or rotors of a machine during operation; for example, the rotor of an axial flow compressor forming part of a gas-turbine engine experiences a forward thrust during operation which must be taken through a bearing directly or indirectly on to stationary structure.

According to the present invention a thrust bearing arrangement for transmitting axial thrust between two relatively rotatable parts comprises a flat face on one of said parts at right angles to the axis about which relative rotation occurs, a part-spherical face on the adjacent end of the other of said parts having its centre of curvature on said axis and, trapped between said faces, a member having a flat face co-operating with said flat face on said one part and a part-spherical face of similar curvature to and co-operating with said part-spherical face on said other part, means being provided to supply gas under pressure to between the pair of flat faces and to between the pair of part-spherical faces to prevent contact therebetween.

In use of such a thrust bearing, the axial thrust on one of the parts will be transmitted by virtue of the gas pressure acting on the faces from one part through the trapped member to the other part.

Both of said parts may be rotating or one part may rotate and the other part may be stationary and in the latter case the flat face may be formed on the stationary structure and the part-spherical face on the end of the rotating part or vice versa.

According to a feature of the invention the trapped member is hollow, has an aperture in one of its faces registering with a corresponding aperture in the co-operating face of one of the parts, pressure gas being supplied through said apertures to the interior of the trapped member, and the flat and part-spherical faces of which are provided with orifice means to supply pressure gas to between the pairs of co-operating faces from the interior of the trapped member.

According to one preferred arrangement of the invention, the orifice means comprises in each of the said faces of the trapped member two radially-spaced annular rows of orifices, leakage of pressure gas from between the pairs of co-operating faces is permitted from the outer edge of the trapped member, and an annular channel is provided in each face of the trapped member between the radially-inner row of orifices and the edge of the aperture in the face to receive leakage gas at inner radius, the channels in the two faces being connected together by tubes and the channel in the flat face registering with an exhaust aperture in the flat face on said one part.

In another preferred arrangement, the orifice means comprises a single annular row of orifices at outer radius in both faces of the trapped member, leakage of pressure gas being permitted from the outer edge only of the trapped member.

Since the flat faces are at right angles to the axis of rotation, no resultant load at right angles to the axis of rotation will be produced. Separate means will therefore be necessary to take any transverse loads, for example, the weight of a rotating part if its axis is horizontal.

According to this invention in another aspect thereof there is provided in combination a thrust-bearing arrangement as above set forth and a gas-lubricated journal bearing surrounding and supporting the end of the rotating part, or a rotating part, adjacent the thrust-bearing arrangement, said journal bearing being supported in a manner to accommodate non-linearity of the rotating part, for example, by means of a flexible diaphragm.

In a preferred arrangement of this aspect of the invention one of the parts between which relative rotation occurs is stationary structure and the other part is a rotating hollow shaft. The trapped member is hollow and is shaped externally so as to have a flat face and a face which is a cap of a sphere, a flat face is formed on the stationary structure to co-operate with the flat face of the trapped member, a part-spherical face is formed on the end of the shaft to co-operate with spherical-cap face of the trapped member, the flat and part-spherical faces of the trapped member each contain a central aperture registering respectively with an aperture in the flat face on stationary structure and an aperture in the part-spherical face on the end of the shaft, pressure gas being supplied to the aperture in stationary structure to be supplied through the apertures to the interiors of the trapped member and the hollow shaft, orifice means is provided in the flat and part-spherical faces of the cap member to supply pressure gas to between the pairs of co-operating faces, and the end of the hollow shaft adjacent the trapped member is supported by the gas-lubricated journal bearing which is supplied with pressure gas from the interior of the hollow shaft and is supported from the stationary structure by means of a flexible diaphragm.

Figure 2:
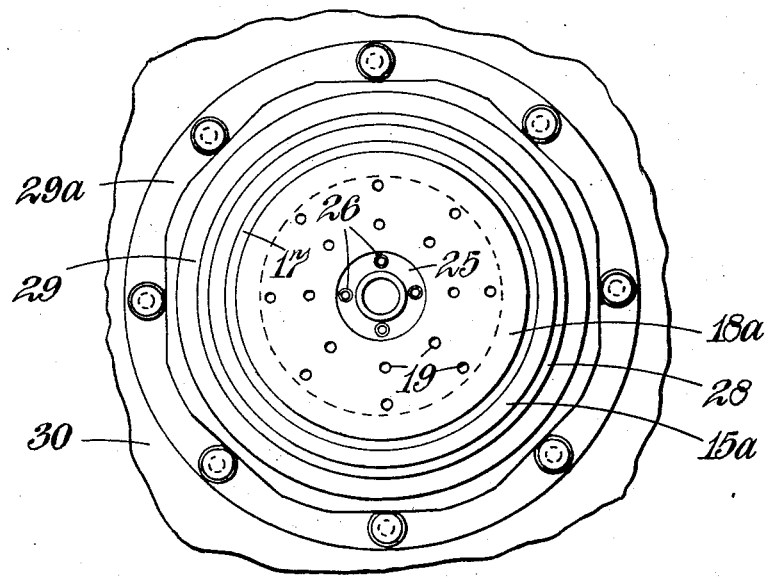
Figure 3:
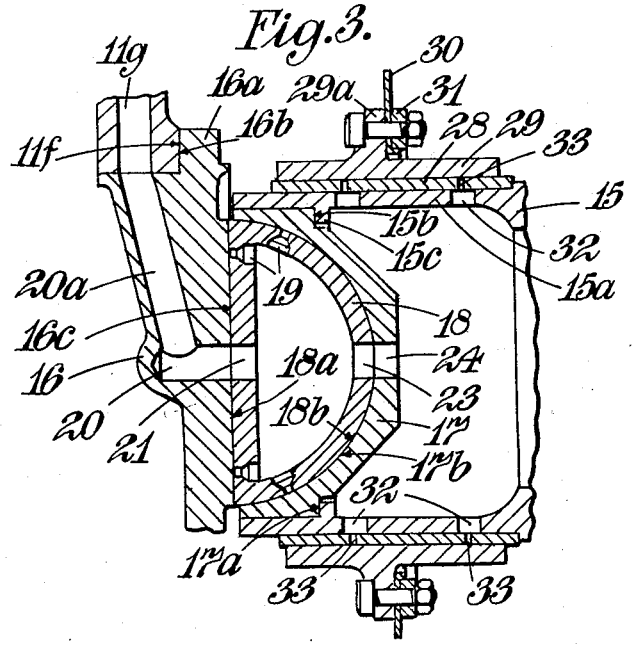

Two embodiments of the invention will now be described with reference to the accompanying drawings of which:

Figure 1 is an axial section through the forward end of an axial-flow compressor of a gas turbine engine, Figure 2 is a view on the line 2—2 of Figure 1, and Figure 3 is a view corresponding to Figure 1 of a modification.

The engine is of the closed-cycle type using helium as working fluid.

The stationary outer casing 10 of the compressor terminates at its forward end in a bolting flange 10a to which is secured a similar flange 11a of an inlet duct structure 11 having outer and inner walls 11b and 11c respectively. Aerofoil section struts 11d interconnect the inner and outer walls 11b, 11c and an annular web portion 11e projects radially-inwards from the inner wall 11c.

There is illustrated the first row of stator blades 12 which are carried by the stationary outer casing 10, and the first row of rotor blades 13 which are carried on a rotor disc 14 mounted on a hollow rotor shaft 15.

The forward end of the rotor shaft 15 is carried by a bearing arrangement which will now be described.

The annular web portion 11e of the inlet duct portion has a central circular aperture which receives a circular thrust plate 16 having a radial flange 16a, the radial surface 16b of which abuts a corresponding radial surface 11f on the web portion 11e. The thrust plate 16 has a flat surface 16c facing the shaft 15.

The hollow rotor shaft 15 has at its forward end an enlarged cylindrical portion 15a which is closed by a cup member 17 received in spigot fashion in the end of the shaft. The cup member 17 has a radial annular surface 17a abutting against a similar surface 15b formed on an inward radial flame 15c on the shaft 15. The cup member 17 has a concave part-spherical surface 17b with its centre of generation on the shaft axis.

A hollow hemispherical member 18 is trapped between the flat face 16c of the thrust plate 16 and the part-spherical surface 17b of the cup member 17 and has a flat surface 18a facing the surface 16c and a hemispherical surface 18b occupying the cup member 17. Each of the surfaces 18a, 18b has two radially-spaced annular rows of orifices 19.

The thrust plate 16 has a central bore 20 terminating in the centre of the flat face 16c and registering with an aperture 21 in the centre of the flat face of the hemispherical member 18. The bore 20 is in communication with a substantially radial bore 20a, the outer end of which registers with the inner end of a radial bore 11g in the web portion 11e. At its outer end the radial bore 11g receives a pipe 22 connected to a source of gas (in this case helium) under pressure. In the centre of the hemispherical surface 18b of the hemispherical member 18, there is an aperture 23 which registers with a corresponding aperture 24 in the centre of the cup member 17. Helium under pressure is thus admitted to the interior of the hemispherical member 18 and is also admitted through the apertures 23 and 24 to the interior of the hollow rotor shaft 15.

An annular channel 25 is provided in each of the flat and hemispherical surfaces 18a, 18b of the hemispherical member 18 radially between the apertures 21 and 23 and the radially-inner row of orifices 19 and the channels 25 are connected together by axially-extending tubes 26. The channel 25 in the flat face 18a registers with a duct 27 in the thrust plate 16.

Helium under pressure in the interior of the hemispherical member 18 flows to between the flat faces 18a and 16c by means of the two annular rows of holes 19 and leaks from these surfaces from their outer edges and at inner radius into the corresponding annular channel 25. The two flat faces are thus maintained apart by an annular band of helium, the pressure of which is constant in the radial direction between the two rows of orifices 19 and falls from the outer row to the outer edges of the flat surfaces and from the inner row of orifices 19 to the annular channel 25 which communicates with exhaust duct 27. A similar action occurs with the part-spherical surfaces 17b and 18b, the pressure gas exhausting at outer radius from the edges of the part-spherical surfaces and at inner radius exhausting into the channel 25 in the hemispherical surface of the member 18 and flowing from the channel 25 through the tubes 26 and the other annular channel 25 into the duct 27.

The hemispherical member 18 thus floats inside the hemispherical cavity formed by the surfaces 16c and 17b and the forward thrust on the rotor shaft 15 is transmitted to the thrust plate 16 by the gas pressure loads exerted between the pairs of surfaces 17b, 18b and 18a, 16c.

The arrangement will also cater for slight non-linearity of the shaft due to example to whirling, the cup member 17 being able to move slightly over the hemispherical member 18 in planes passing through the rotor axis.

It will be appreciated that the bearing arrangement so far described provides no lateral support for the rotor shaft as the flat face 18a of the member 18 is free to move over the flat face 16c on the thrust plate 16. A separate gas-lubricated bearing is employed for this purpose and will now be described.

Encircling the enlarged cylindrical end 15a of the rotor shaft 15 is a sleeve 28 and surrounding the sleeve with a small clearance is an outer bearing member 29 having approximately mid-way along its length an external flange 29a. The bearing member 29 is supported by a flexible diaphragm 30, the inner edge of the diaphragm being clamped between the flange 29a and a ring 31 by means of nuts and bolts and the outer edge of the diaphragm 30 being secured to a flange 11h on the inner surface of the inner wall 11c in a similar manner.

Two rows of apertures 32 are formed around the enlarged cylindrical portion 15a of the rotor shaft in line with orifices 33 in the sleeve 28.

Helium under pressure flows from the interior of the shaft 15 through orifices 32, 33 into the clearance space between the sleeve 28 and bearing member 29 and then exhausts from the clearance space at its ends.

The weight of the rotor is thus transferred from the sleeve 28 to the bearing member 29 by means of the pressure gas therebetween, slight non-linearity of the shaft being accommodated by flexing of the diaphragm 30.

In the modification shown in Figure 3, one annular row of orifices 19 is provided at outer radius in both the flat and part-spherical faces 18a, 18b of the hemisphere 18, the inner annular rows of orifices being omitted and the means to receive leakage gas at inner radius also being omitted. The pairs of flat and part-spherical faces will thus be maintained apart by an annular band of pressure helium extending between the co-operative surfaces, the pressure being constant radially outwards from the edges of the apertures 21 and 23 to the row of orifices 19 and falling from the rows of orifices to the edge of the hemisphere. Leakage at inner radius will, of course, be prevented by the fact that the inner edges of the co-operating faces are in contact with helium at supply pressure.

It will be appreciated that gas-lubricated bearings are of particular advantage in the present case since the gas is the same as the working fluid and thus sealing problems are not so acute as would be the case if oil had to be prevented from contaminating the working fluid.

I claim:
1. In a closed cycle gas turbine engine having at least two relatively rotatable parts, a thrust bearing arrangement for transmitting axial thrust between the relatively rotatable parts comprising a flat face on one of said relatively-rotating parts at right angles to the axis about which said relative rotation occurs, a part-spherical face on the other of said parts and adjacent said flat face, the part-spherical face having its center of curvature on said axis, a hollow member disposed between said flat face and said part-spherical face, the hollow member having a flat face co-operating with the flat face on said one part and a part-spherical face of similar curvature to, and co-operating with, said part-spherical face on said other of the relatively-rotating parts, the hollow member having a plurality of relatively small orifices in each of its flat and part-spherical faces, and pressure gas supply means connected to the interior of the hollow member to supply gas under pressure thereto whereby said gas is caused to flow through said orifices and between the flat and part-spherical faces on said member and the co-operating faces on said relatively rotatable parts to maintain the parts out of contact.

2. In a closed cycle gas turbine engine, a thrust bearing arrangement according to claim 1, wherein the orifice means comprises a single annular row of orifices at outer radius in both faces of the hollow member, leakage of pressure gas being permitted from the outer edge only of the trapped member.

3. In a closed cycle gas turbine engine having at least two relatively rotatable parts, a thrust bearing arrangement for transmitting axial thrust between the relatively rotatable parts comprising a flat face on one of said relatively-rotating parts at right angles to the axis about which said relative rotation occurs, a part-spherical face on the other of said parts and adjacent said flat face, the part-spherical face having its center of curvature on said axis, a hollow member disposed between said flat face and said part-spherical face, the hollow member having a flat face cooperating with the flat face on said one part and a part-spherical face of similar curvature to, and cooperating with, said part-spherical face on said other of the relatively-rotating parts, an aperture centrally of one face of the hollow member, a registering aperture in the cooperating face of the relatively rotating parts, pressure gas supply means connected to deliver pressure gas through said apertures to the interior of the hollow member, two radially-spaced annular rows of orifices in each of the said faces of the hollow member, leakage of pressure gas from between the pairs of cooperating faces occurring from the outer edge of the hollow member, an annular channel in each face of the hollow member radially within the radially-inner row of orifices, the annular channel in said one face of the hollow member also encircling the aperture in the face, tubes connecting the channels in the two faces of the hollow member, and an exhaust aperture in the flat face of said one of the relatively rotating parts, the exhaust aperture registering with the channel in the flat face of the hollow member.

4. In a closed cycle gas turbine engine having at least two relatively rotatable parts, a thrust bearing arrangement for transmitting axial thrust between the relatively rotatable parts comprising a flat face on one of said relatively-rotating parts at right angles to the axis about which said relative rotation occurs, a part-spherical face on the other of said parts and adjacent said flat face, the part-spherical face having its center of curvature on said axis, a hollow member disposed between said flat face and said part-spherical face, the hollow member having a flat face cooperating with the flat face on said one part and a part-spherical face of similar curvature to, and cooperating with, said part-spherical face on said other of the relatively-rotating parts, the hollow member having a plurality of relatively small orifices in each of its flat and part-spherical faces, and pressure gas supply means connected to the interior of the hollow member to supply gas under pressure thereto whereby said gas is caused to flow through said orifices and between the flat and part-spherical faces on said member and the cooperating faces on said relatively rotatable parts to maintain the parts out of contact, and comprising also a gas-lubricated journal bearing supporting the relatively rotating parts with respect to one another, said journal bearing being adjacent the thrust-bearing, said journal bearing being supported in a manner to accommodate non-linearity of the rotating part.

5. In a closed cycle gas turbine engine, a thrust-bearing arrangement as claimed in claim 4, comprising a flexible diaphragm connecting the journal bearing to one of the relatively rotating parts.

6. In a closed cycle gas turbine engine, a thrust-bearing arrangement as claimed in claim 5, wherein one of the relatively rotating parts is a hollow shaft and the other part is stationary structure, said flat faces being formed on the stationary structure and on the adjacent face of the hollow member and said part-spherical faces being provided on the end of the shaft and the adjacent face of the hollow member, the flat and part-spherical faces of the hollow member each having a central aperture registering respectively with an aperture in the flat face on stationary structure and an aperture in the part-spherical face on the end of the shaft, the pressure gas supply means being connected to the aperture in stationary structure whereby pressure gas is supplied through the apertures to the interior of the hollow member and into the hollow shaft, the end of the hollow shaft adjacent the hollow member being supported in the stationary structure by the gas-lubricated journal bearing, and means connecting the journal bearing to the interior of the shaft to be supplied with pressure gas therefrom.

References Cited in the file of this patent

UNITED STATES PATENTS

| | | |
|---|---|---|
| 2,155,455 | Thoma | Apr. 25, 1939 |
| 2,617,696 | Honiss | Nov. 11, 1952 |
| 2,729,106 | Mathiesen | Jan. 3, 1956 |
| 2,870,608 | Comyns-Carr | Jan. 27, 1959 |